Figure 1:
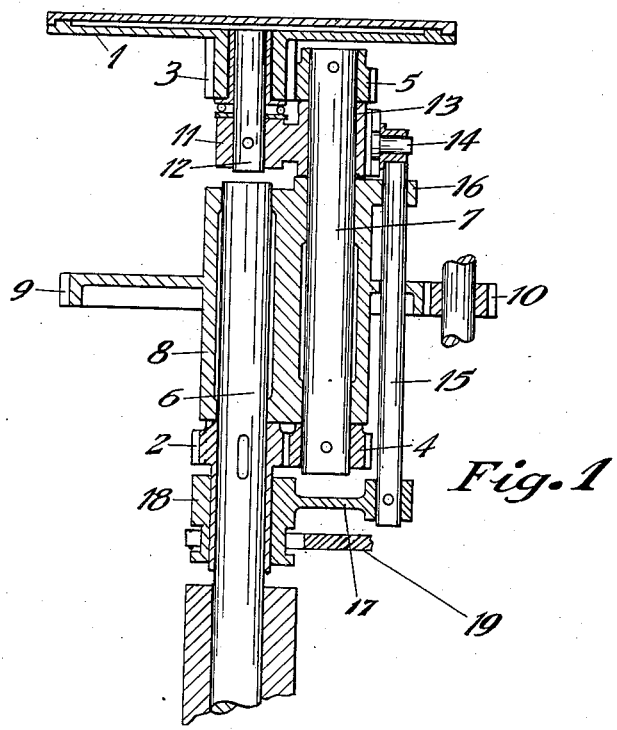

Jan. 30, 1940.                O. FLORIAN                2,188,501
       VARIABLE ORBITAL DRIVE GEAR FOR DOUGH ROUNDERS OR THE LIKE
                        Filed Oct. 13, 1938

INVENTOR.
OTTO FLORIAN
BY
ATTORNEY

Patented Jan. 30, 1940

2,188,501

UNITED STATES PATENT OFFICE 2,188,501

VARIABLE ORBITAL DRIVE GEAR FOR DOUGH ROUNDERS OR THE LIKE

Otto Florian, Stuttgart, Germany, assignor to Baker Perkins Company, Inc., Saginaw, Mich., a corporation of New York Application October 13, 1938, Serial No. 234,771
In Germany October 13, 1937

2 Claims. (Cl. 74—300)

This invention relates to drive mechanisms for producing orbital movements of machine elements variable continuously and smoothly in radius or extent. More particularly it pertains to dough-working machines of the general type in which an orbitally revolving horizontal work-table co-operates with a stationary mold board, a dividing and rounding head divided into compartments for the cutting and rounding of small dough pieces, or other complementary element or tool.

The principal object of my invention is to provide an improved driving and actuating mechanism for imparting the desired orbital movement to the work-table referred to, or to any other driven element which it may be desirable to move in a like path.

A further object of the invention is to provide a simple, inexpensive, and efficient drive member having as an integral part improved means for smoothly and continuously varying the range of travel of the work-table either manually or automatically, that is, for adjusting the radius of the orbit through which the work-table moves.

A further feature of the invention is the provision of simple means inherent in the device for guiding the work-table and preventing its rotation about its own axis, so that the guide members and parallel motion devices heretofore necessary in machines of this kind are not required. In the machines heretofore driven by cranks or eccentrics, the cranks have been provided with eccentric or crank-pins adjustable so that the axis of the crank-pins could be brought into alinement with the axis of the crank-shaft bearings, diminishing the orbital movement of the table, or stopping it for the purpose of loading or unloading the work-table without stopping of the machine drive. This use of cranks or eccentrics to produce the orbital oscillation of the work-table had the disadvantage that when two cranks were employed to give a parallel motion to the table they had to be exactly indexed relatively to each other and the machine parts had to be most precisely fitted to avoid pinching and excessive wear of the bearings during operation. While this difficulty suggested the use of a single crank or eccentric drive for the work-table, special means were then required to guide the work-table in a single plane and to prevent its rotation about its own axis. The present invention not only does away with the need for adjustable cranks to permit varying the working stroke, but also eliminates the need for two cranks, or the alternative use of guiding means for the work-table to maintain its working face in one plane and to prevent its rotation.

Since the invention requires no guide means for the work-table, the table, its driving gears, and the associated mechanism for varying the orbit of the table or other driven element are removable as a unit from the machine base for repairs, cleaning or servicing.

The invention consists of a novel planetary gear assembly comprising a revolving head or turret journaled upon a main axis and carrying planet gears journaled about an axis laterally offset with respect to the main axis and parallel thereto, which planetary gears revolve about a stationary sun gear on the central axis and are driven thereby. The work-table or other driven element is rotatably journaled coaxial with a second sun gear in a bracket which is mounted for pivotal movement about the main axis. The second-mentioned sun gear is fixed relative to the work-table and meshes with the second of said planet gears. Means is provided for pivotally adjusting the axis of the work-table and its sun gear with respect to the main axis, whereby the work-table may be brought to rest or made to revolve orbitally about the main axis of the machine through paths of various radii.

Other features of the invention will be made apparent in the course of the following specification.

Figure 2:
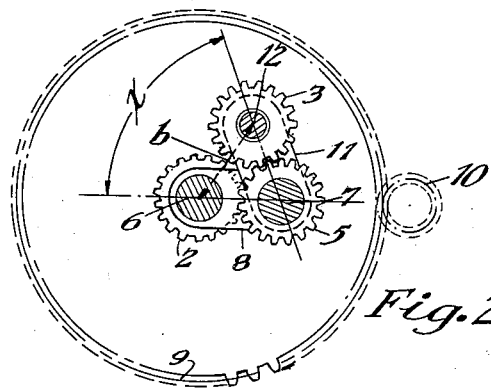

Referring to the drawing, Fig. 1 is a vertical section through a drive gear, according to the invention, taken along line $x$—$x$ of Fig. 2, and Fig. 2 is a top plan view of the gearing arrangement of Fig. 1, taken along line 2—2 in Fig. 1, the work-table having been removed.

In the drawing, the element which is to be moved in an orbital path consists of a flat plate 1 and the movable dough-working element of a star divider and rounder. The known dividing head (not shown) may be located above plate 1 in known manner, or if the machine is to be used as a rounder only, a stationary work plate may be positioned co-operatively above the work-table 1. A sun gear 2 is fixed to a stationary main axis shaft 6 suitably mounted in the machine frame, not shown. A second sun gear 3 is fixed to or integral with the table 1, and is arcuately movable to and from alignment with the axis 6 of gear 2, hereinafter fully described. A pair of planet gears 4 and 5 are fixed to a common planet shaft 7, rotatably mounted parallel to main shaft 6 in a head or turret 8 which is journaled for rotation about shaft 6. Planet gears 4 and 5 mesh with sun gears 2 and 3 respectively, so that when head 8, and planet shaft 7 revolve about axis 6, shaft 7 and gears 4 and 5 maintain a constant angular relation between sun gears 2 and 3. That is to say gear 3 is held against rotation relative to stationary gear 2.

Turret head 8 is the main body of the drive gear. It carries all of the working parts, and may be lifted bodily from the axis 6 with the entire assembly. Head 8 may be rotatably driven in any desired way, as by a peripheral gear 9 meshing with a pinion 10 which is driven by a motor, not shown, or any other desired source of power. A horizontal sleeve bracket 11 is journaled for free movement on the axis 7 and carries a stub shaft 12 upon which sun gear 3 and head 1 are journaled. Shaft 12 is offset from the planet axis 7 to the same amount as the planet axis is radially offset with respect to the main axis 6, and is parallel to both.

Bracket or arm 11 is oscillatable about planet axis 7 so that the sun gear 3 and the work-table 1 may be swung to and away from axial alignment with the main axis 6 of the machine. Various means may be employed for adjustably swinging sun wheel 3 and work-table 1 about axis 7. One simple mechanism for this purpose is illustrated and consists of the provision of a slanting or helical cam slot 13 on the outer periphery of the part 11. A correspondingly shaped cam follower 14 is received in the cam slot 13 and is vertically adjustable, as by means of a rod 15, so that endwise movement of the rod produces a swinging movement of bracket 11 about axis 7. Raising rod 15 moves the axis of sun gear 3 away from the main axis 6, and lowering it swings sun gear 3 back into axial alignment with axis 6. Rod 15 slidably held in a sleeve 16 in the revolving body 8 passes through gear 9 downward to a radial arm 17 connected to a sleeve 18 on the axis 6 of the machine. Sleeve 18, which rotates with head 8, is provided with a peripheral groove and is movable axially, in known manner, as by means of a fork 19.

The operation of the machine is as follows:

Assuming that bracket 11 is positioned so that the axis 12 of sun gear 3 is aligned with the main axis 6 of the machine and with the stationary gear 2; when the rotatable body 8 of the machine is driven through gears 9 and 10, the planet axis 7 is carried around the main axis 6. Planet gears 4 and 5 revolve about gears 2 and 3 and gear 3 remains stationary. The work-table 1 thus remains at rest so long as its axis 12 is aligned with axis 6. When rod 15 is raised, and, through the action of cam track and follower 13, 14, swings bracket 11 about axis 7, the axis 12 of sun gear 3 is moved out of alignment with main axis 6 of sun gear 2, to the extent indicated by $b$ in Fig. 2 and measured by arc X. As this occurs and rotation of the body 8 of the machine continues, the sun gear 3 and the work-table revolve with the body 8. Each point in sun wheel 3 or in work-table 1 describes a circle of revolution whose radius is equal to the distance $b$ between the axes 6 and 12. The further the axis of sun wheel 3 is moved away from the center of axis 6, the greater will be the working stroke or orbit of the tool 1. Sun gear 3 and the work-table 1 do not rotate in space while they revolve with body 8 of the machine. The rotation of planet gears 4 and 5 relative to body 8 sets up rotation of gear 3 counter to the rotation of body 8 at exactly the same angular velocity, so that the work-table remains parallel to itself during its circular movement of revolution. Special devices for parallel guidance of the work-table and for preventing its rotation, which were required in previous machines, are therefore not needed in the improved apparatus.

From the foregoing description it can be seen that if distance $b$ between the axes 6 and 12 is unchanged during a revolution of head 8, the work-table 1 will be moved through a circular orbit, the radius of which is proportional to distance $b$ between sun gear 3 and the center of the machine. The machine may however also be operated to move work-table 1 or other driven element through orbital paths of varying shapes and sizes. For example, the table 1 may be given an elliptical or oval travel by alternately increasing and decreasing the distance $b$ between the axes of the two sun gears once during each revolution of head 8. A cam mechanism of known kind may be employed for this purpose, arranged to raise and lower rod 15 once each time the machine head revolves.

Furthermore, if distance $b$ is uniformly increased during several rotations of head 8 and then gradually decreased the work-table will describe first an increasing, then a diminishing spiral.

While for purposes of illustration the invention has been shown and described as part of a dough rounding machine, it is applicable to many other purposes without departing from the scope of the appended claims. For example, it may be advantageously used to agitate the sieve carrier of a screen sizing and classifying machine.

Having thus described my invention, what I claim and desire to secure by Letters Patent is:

1. A machine for imparting orbital motion to a driven element comprising in combination, a main axis, a turret head mounted for rotation about said main axis, means for rotatably driving said head, a stationary sun gear centered on said main axis, a planet shaft journaled in said head parallel to and radially offset from said main axis, a planet gear fixed to said planet shaft and meshing with said sun gear, a second planet gear fixed to said planet shaft, and a second sun gear fixed to said driven element meshing with said second planet gear, said second sun gear and driven element rotatably mounted on said rotatable turret head, their axes parallel to said planet shaft and laterally offset relative to said main axis, whereby said driven element revolves with said turret head through an orbit determined by the distance of its axis from said main axis but is maintained in one angular relationship to the first said sun gear by the meshing coaxial planet gears.

2. Apparatus as claimed in claim 1, wherein said driven element and said second sun gear are pivotally adjustable about said planet shaft and gear toward and from a position of alignment with said main axis, whereby the size of the orbit described by the driven element may be decreased or increased.

OTTO FLORIAN.